(12) United States Patent
Ayers

(10) Patent No.: US 9,889,599 B2
(45) Date of Patent: Feb. 13, 2018

(54) MULTI-TEMPERATURE CONTACT APPLICATOR

(71) Applicant: Illinois Tool Works Inc., Glenview, IL (US)

(72) Inventor: Andrew S. Ayers, Hendersonville, TN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/265,471

(22) Filed: Sep. 14, 2016

(65) Prior Publication Data

US 2017/0072624 A1    Mar. 16, 2017

Related U.S. Application Data

(60) Provisional application No. 62/218,961, filed on Sep. 15, 2015.

(51) Int. Cl.
*B29C 65/48* (2006.01)
*B05C 5/02* (2006.01)
(Continued)

(52) U.S. Cl.
CPC .......... *B29C 65/4815* (2013.01); *B05B 1/044* (2013.01); *B05C 5/001* (2013.01);
(Continued)

(58) Field of Classification Search
CPC . B05C 11/1042; B05C 5/0254; B05C 5/0258; B05C 5/027; B05C 9/06; B05C 5/001; B29C 65/4815; B29C 47/0007; B29C 47/06; B29C 47/068; B29C 47/0811; B29C 47/0815; B29C 47/145;
(Continued)

(56) References Cited

U.S. PATENT DOCUMENTS 3,967,581 A * 7/1976 Zirbel ................... B05C 5/0204
118/410
6,164,568 A * 12/2000 Muller .................. B05C 5/0237
239/584

(Continued)

FOREIGN PATENT DOCUMENTS

WO    2011025603 A1    3/2011

OTHER PUBLICATIONS

International Search Report issued by ISA/EPO in connection with PCT/US2016/051909 dated Jan. 3, 2017.

*Primary Examiner* — Laura Edwards
(74) *Attorney, Agent, or Firm* — Levenfeld Pearlstein, LLC

(57) ABSTRACT

An applicator for applying two materials to a substrate includes a central module configured to receive a first material, a tee block configured to receive a second material, a pair of outer modules spaced from and disposed on opposite sides of the central module, each outer module fluidically connected to and configured to receive the second material from the tee block, and a slot die assembly disposed in fluid communication with the central module and the pair of outer modules, the slot die assembly configured to receive the first and second materials from the central and outer modules, respectively, and discharge the first material over a first width and the second material over a second width greater than the first width.

16 Claims, 13 Drawing Sheets

(51) Int. Cl.
- *B29C 65/52* (2006.01)
- *B29C 65/00* (2006.01)
- *B05B 1/04* (2006.01)
- *B05C 5/00* (2006.01)
- *B05C 9/06* (2006.01)
- *B05C 11/10* (2006.01)

(52) U.S. Cl.
CPC ............ B05C 5/027 (2013.01); B05C 5/0254 (2013.01); B05C 9/06 (2013.01); B05C 11/1042 (2013.01); B29C 65/525 (2013.01); B29C 66/91423 (2013.01)

(58) Field of Classification Search
CPC ......... B29C 47/56; B29C 47/68; B29C 47/80; B29C 47/807; B29C 65/525; B29C 66/91423; B05B 1/044

USPC ................ 118/300, 302, 313, 411, 412, 429; 239/549, 597, 600; 222/146.2, 146.5; 427/286; 137/884

See application file for complete search history.

(56) References Cited

U.S. PATENT DOCUMENTS

| | | | |
|---|---|---|---|
| 6,168,049 B1 * | 1/2001 | Bolyard, Jr. | B05B 15/008 222/146.5 |
| 6,499,631 B2 * | 12/2002 | Zook | B05C 5/001 118/302 |
| 6,669,057 B2 * | 12/2003 | Saidman | B05C 5/001 137/375 |
| 2002/0100513 A1 | 8/2002 | Zook | |
| 2004/0047935 A1 * | 3/2004 | Moss | B29C 45/27 425/145 |
| 2008/0245298 A1 | 10/2008 | Ayers | |
| 2012/0187145 A1 | 7/2012 | Gould et al. | |

* cited by examiner

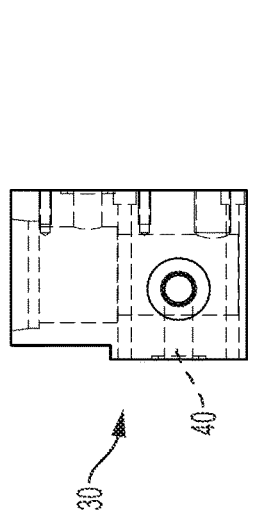
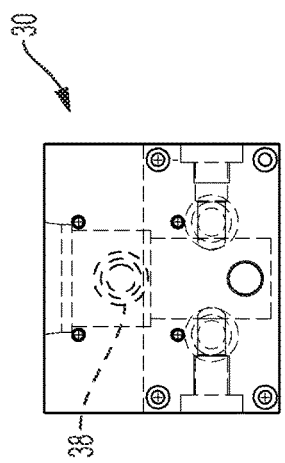
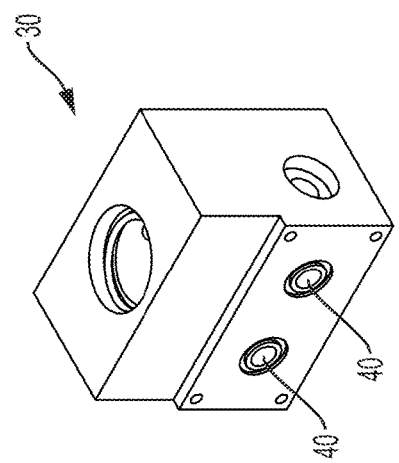
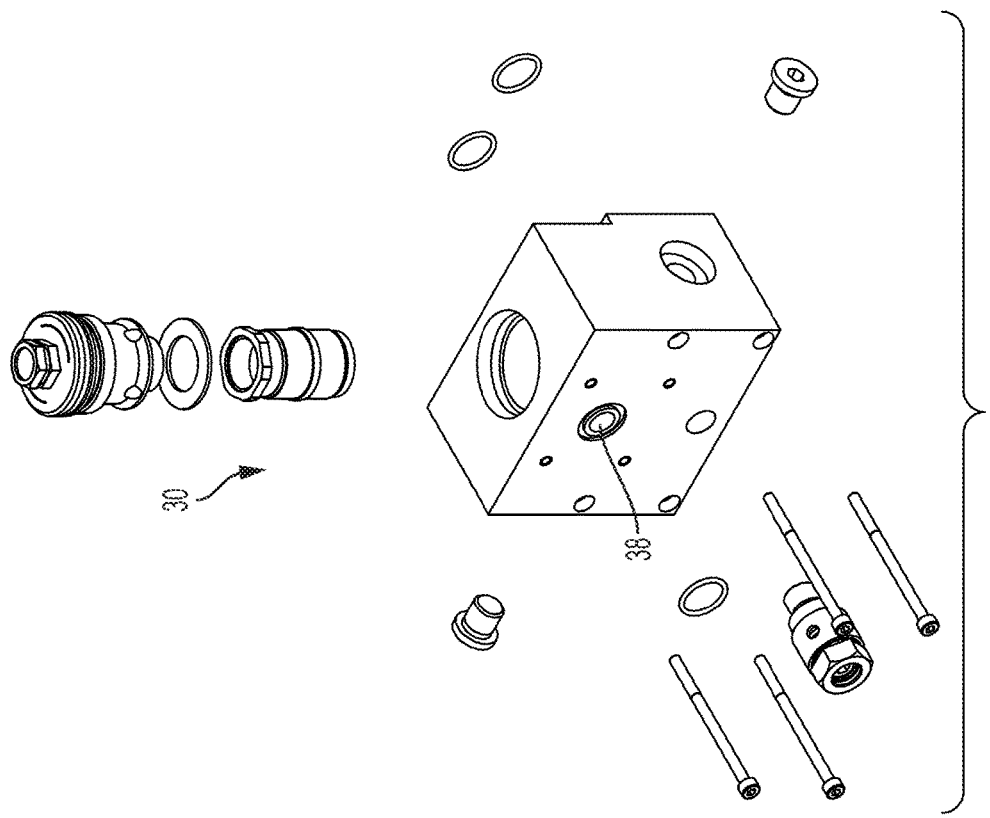

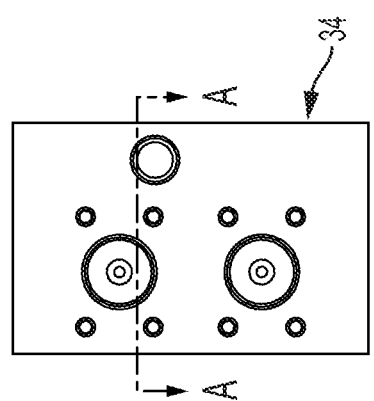
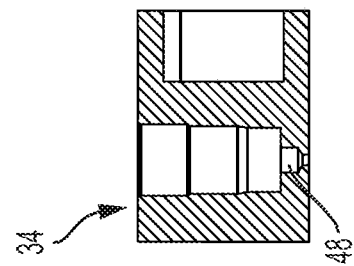
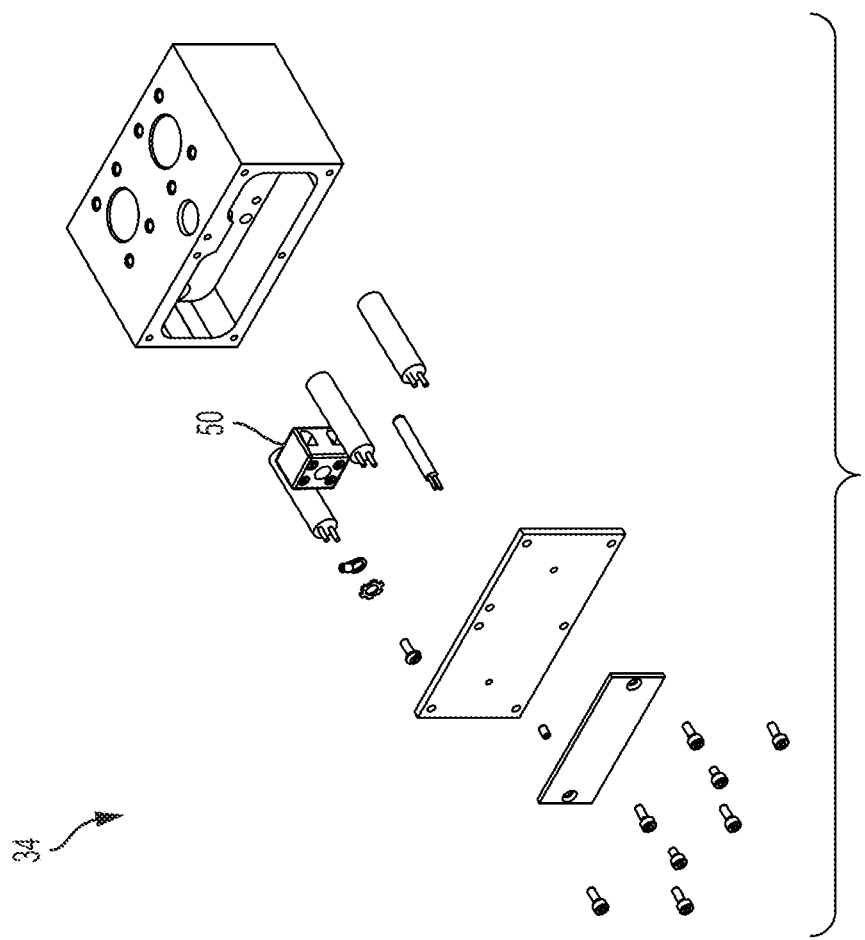

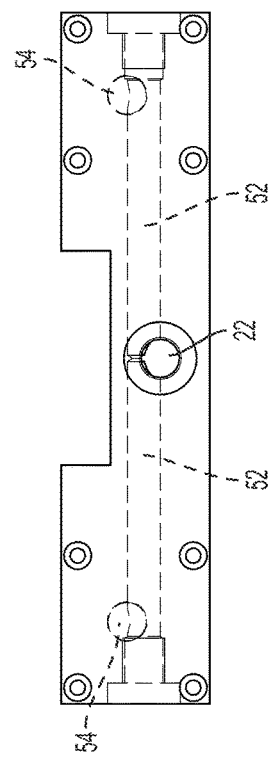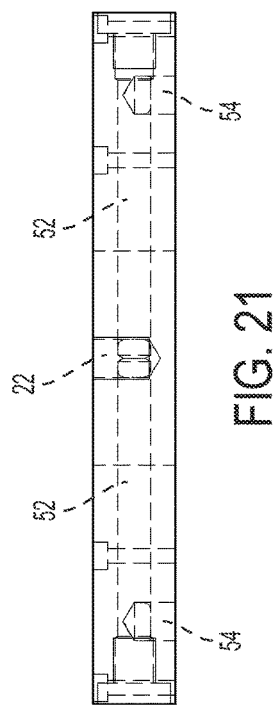

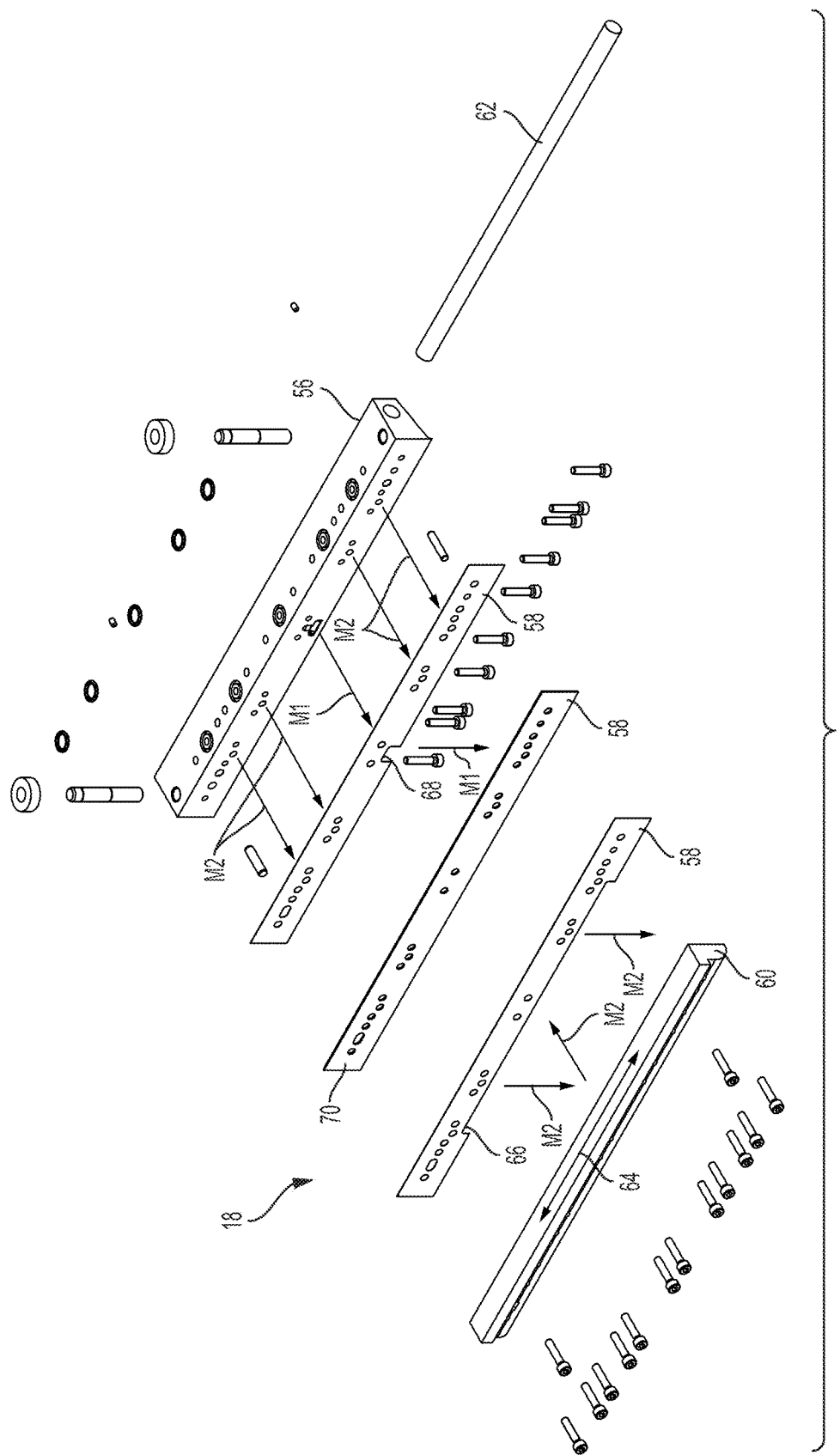

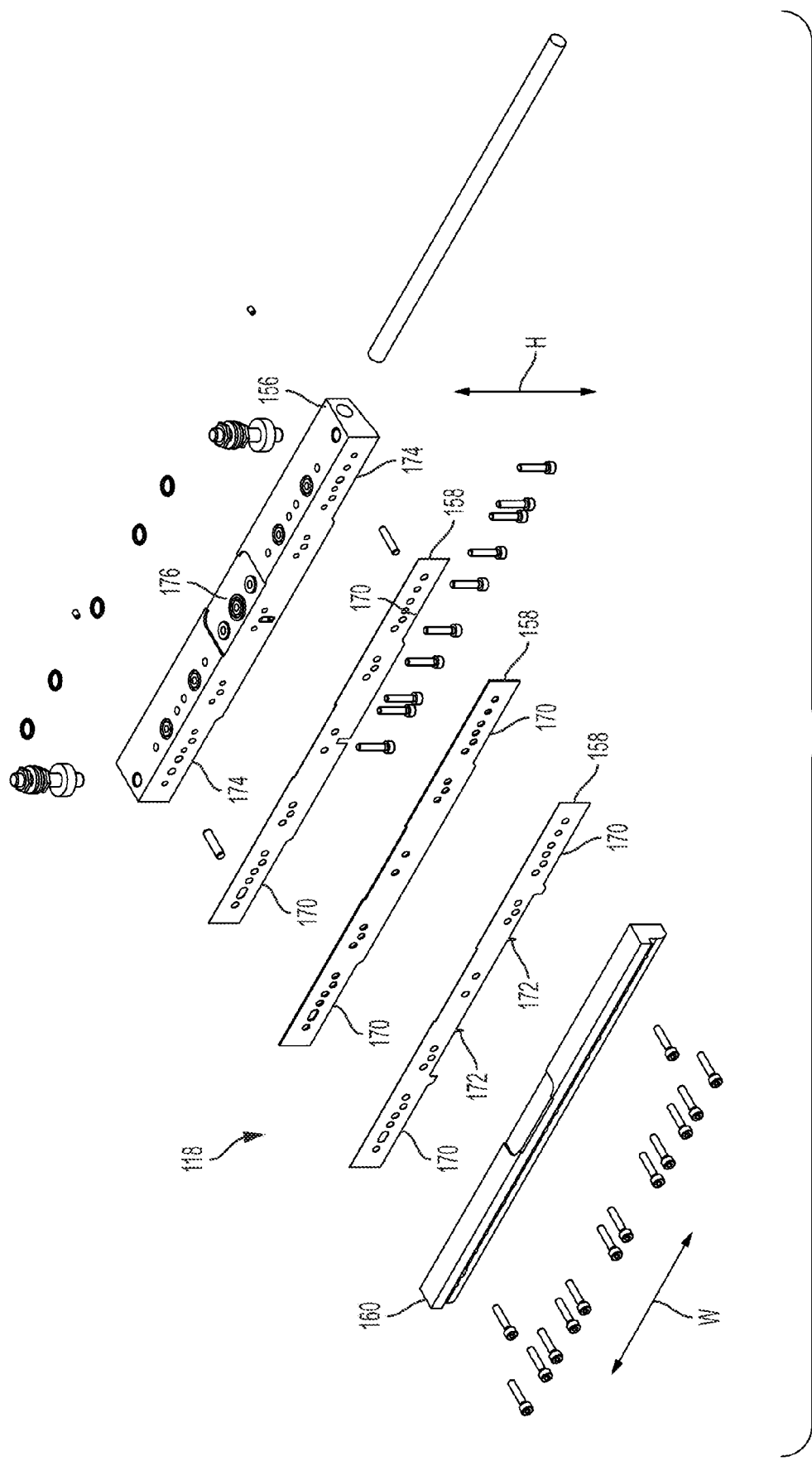

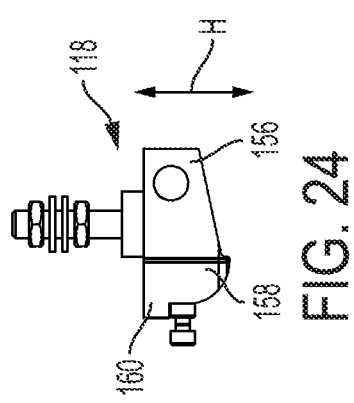
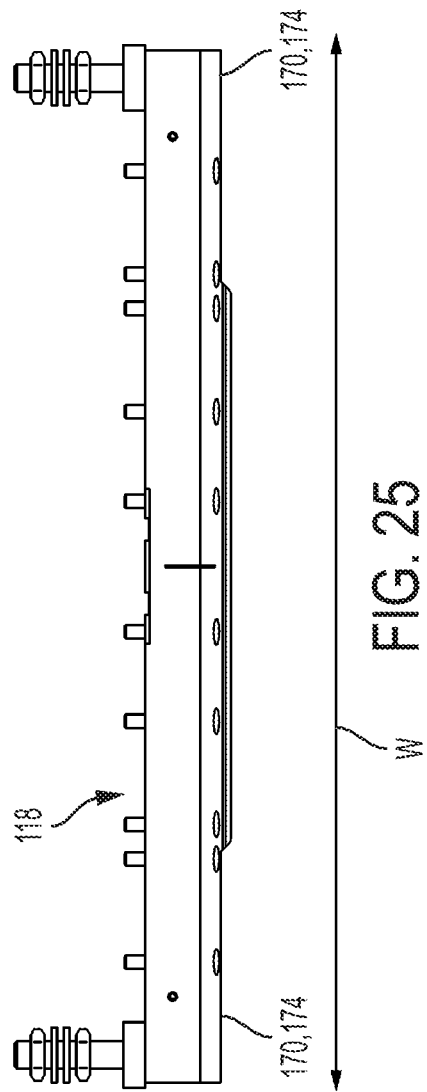
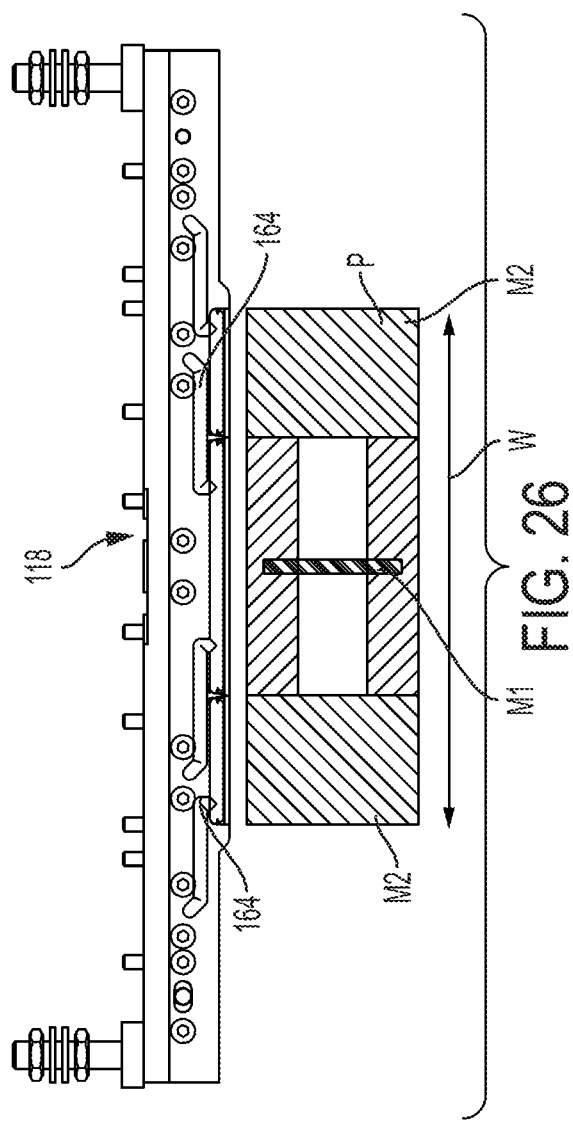

MULTI-TEMPERATURE CONTACT APPLICATOR

BACKGROUND

Adhesive hot melt systems may include an applicator for applying a hot melt adhesive onto a substrate. Conventional applicators include a supply block, an adapter and a nozzle secured to the adapter. The nozzle may be formed as a die extruder assembly configured as a contact-type nozzle to directly apply the hot melt adhesive to the substrate. That is, the die extruder assembly does not discharge the hot melt adhesive over a gap onto the substrate. Rather, the substrate is in contact with the hot melt adhesive as the substrate is fed by the die extruder and the adhesive is discharged from the assembly.

In some applications, it is desirable to apply different materials to the substrate. For example, it may be desirable to apply two materials that bond together on the substrate. In a known application, a first material may be a low temperature material that degrades at temperatures over 110 C, while the second material is a material that flows best at a temperature of 150 C.

In current systems, the first and second materials are applied to the substrate by different applicators. Thus, the first material may be applied first and the second material may be applied after the first material. However, in these systems, the first material has a propensity for being wiped off the substrate when the second material is applied by a contact type nozzle or die assembly. To address this, the first material may be applied with a contact die and the second material may be applied with a non-contact spray type nozzle (i.e., the second material is discharged from the nozzle over a gap onto the substrate). However, this necessitates two applicators and complicated handling of the substrate, as two passes are required. Further, additional time is required to make the two passes. Further still, non-contact nozzles require a slower line speed, compared to contact applications, to ensure a suitable application of the material onto the substrate.

In addition, hot melt adhesives have a limited open or bond time, where joining of two materials bonded by the hot melt adhesive can take place. The extra time and space for two applicators is not optimal for this purpose.

Accordingly, it is desirable to provide a single applicator that can apply two separate and overlapping patterns of materials having different temperature parameters in a single pass.

SUMMARY

According to one aspect, there is provided an applicator for applying two materials onto a substrate. The applicator includes a central module configured to receive a first material, a tee block configured to receive a second material, a pair of outer modules spaced from and disposed on opposite sides of the central module, each outer module fluidically connected to and configured to receive the second material from the tee block, and a slot die assembly disposed in fluid communication and secured to the central module and the pair of outer modules, the slot die assembly configured to receive the first and second materials from the central and outer modules, respectively, and discharge the first material over a first width and the second material over a second width greater than the first width.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIG. 10 is an exploded view a second filter block according to an embodiment described herein;

FIG. 11 is a side view of the second filter block of FIG. 10 including hidden lines;

FIG. 12 is a front view of the second filter block of FIG. 10 including hidden lines;

FIG. 13 is perspective view showing a front side of the second filter block of FIG. 10;

FIG. 17 is an exploded view of a second service block according to an embodiment described herein;

FIG. 18 is a top view of the second service block of FIG. 17;

FIG. 19 is a cross-sectional view of the second service block taken at A-A in FIG. 18;

FIG. 20 is a rear view of a tee block according to an embodiment described herein;

FIG. 21 is a bottom view of the tee block of FIG. 20;

FIG. 22 is an exploded view of a slot die assembly according to an embodiment described herein;

FIG. 23 is an exploded view of a slot die assembly according to another embodiment described herein;

FIG. 24 is a side view of the slot die assembly of FIG. 23;

FIG. 25 is a front view of the slot die assembly of FIG. 23; and

FIG. 26 is a rear transparent view of the slot die assembly of FIG. 23 showing an example of a material application pattern.

DETAILED DESCRIPTION

Figure 1:
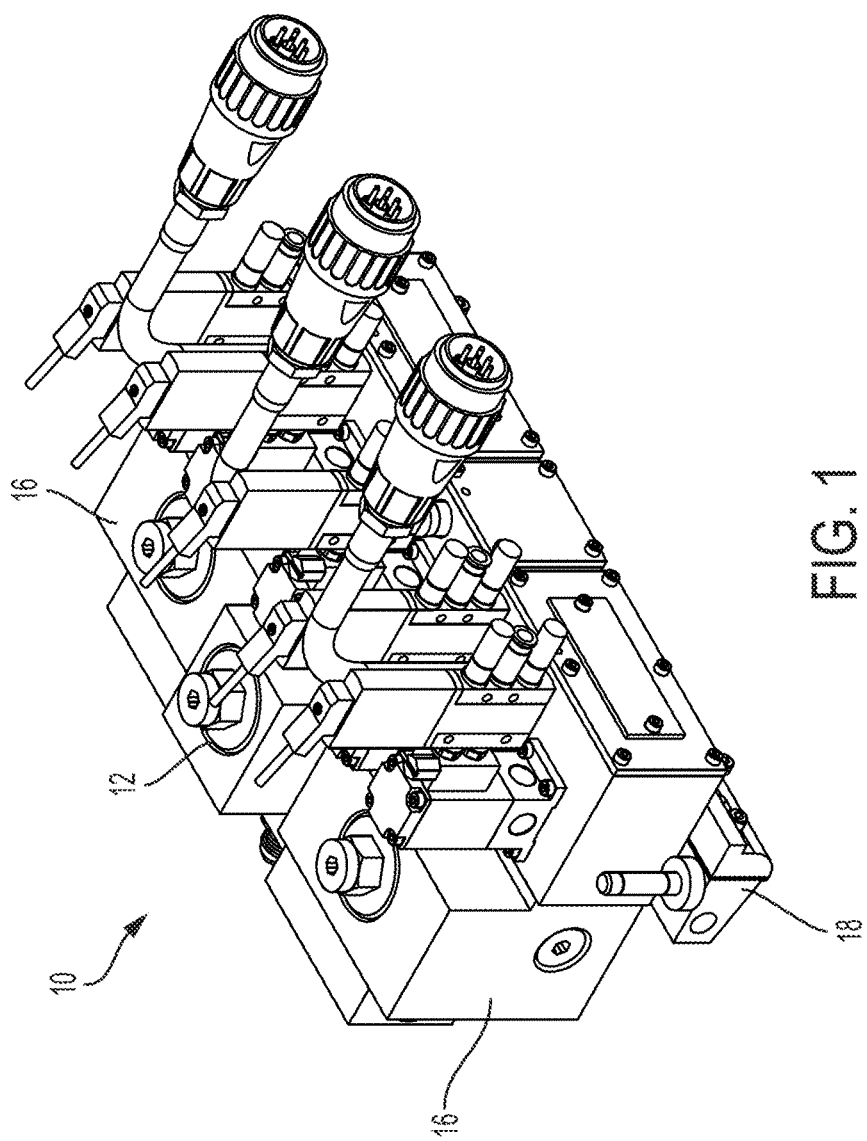
FIG. 1 is a perspective view of an applicator according to an embodiment described herein.
Figure 2:
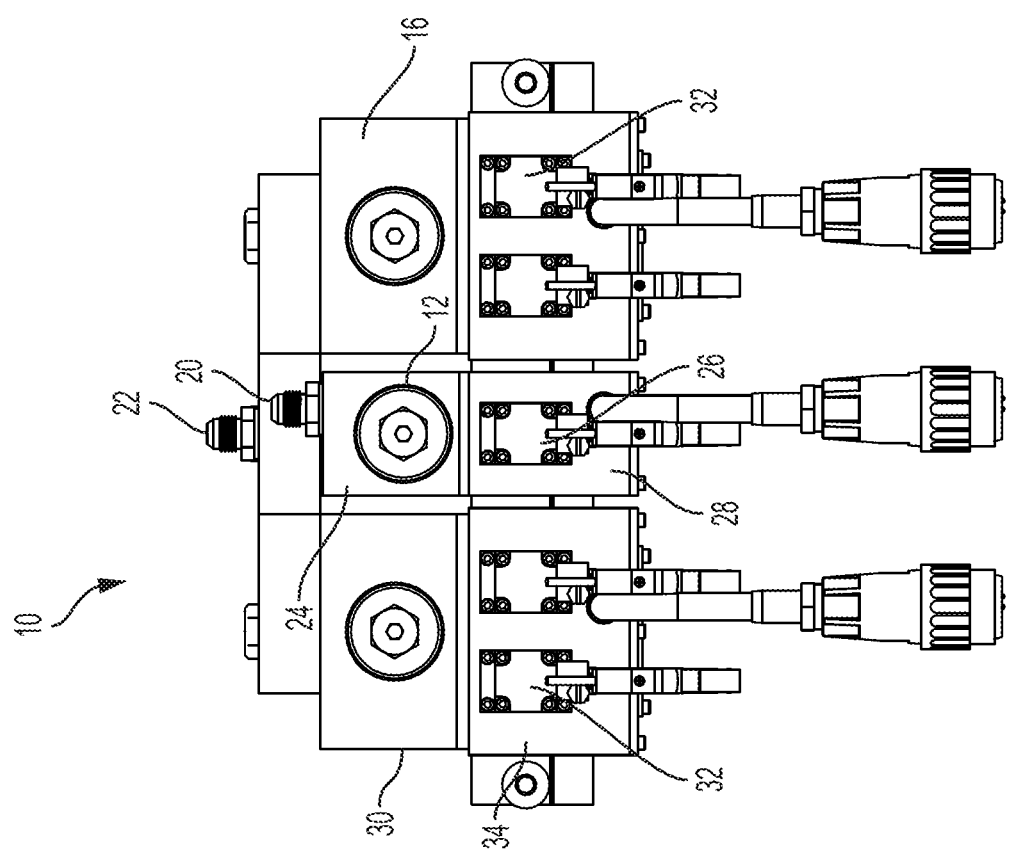
FIG. 2 is a top view of the applicator of FIG. 1, according to an embodiment described herein.
Figure 4:
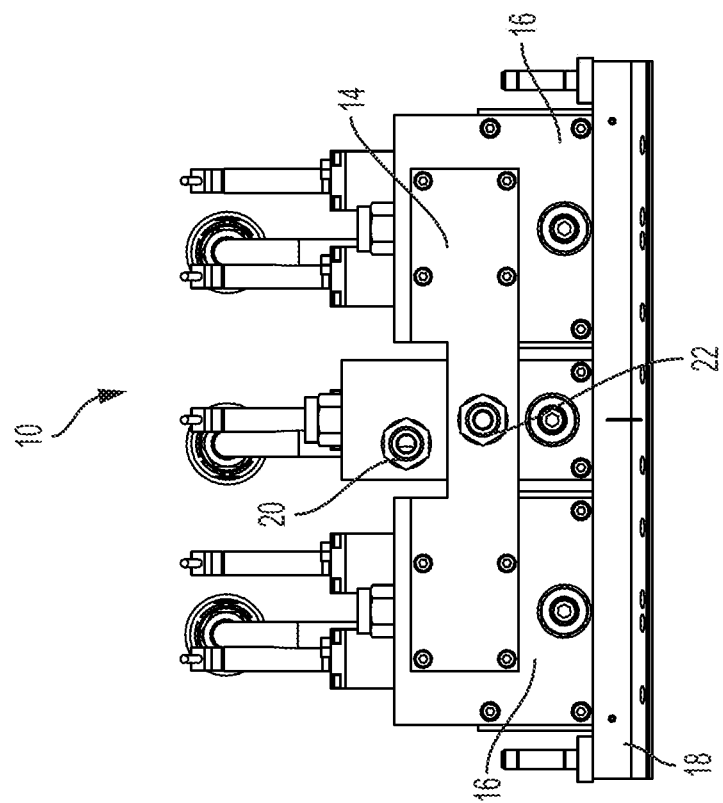
FIG. 4 is a rear view of the applicator of FIG. 1, according to an embodiment described herein.
Figure 3:
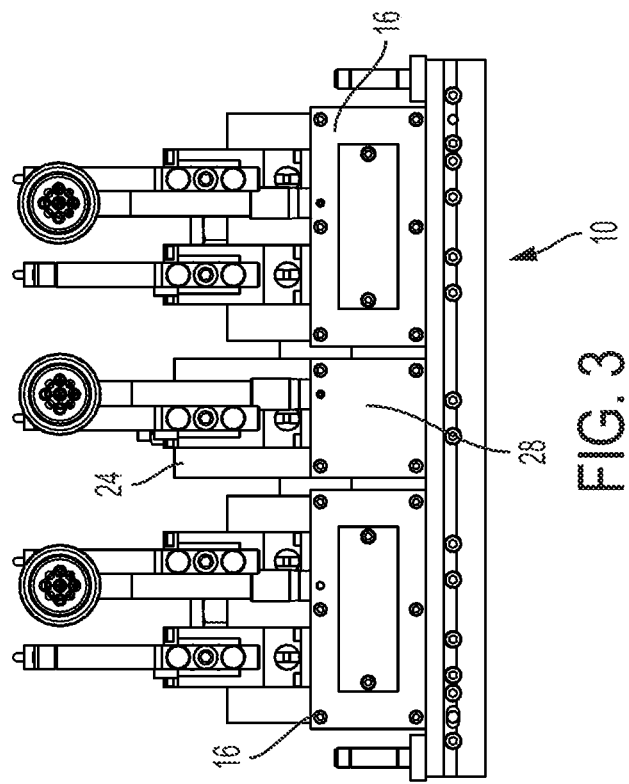
FIG. 3 is a front view of the applicator of FIG. 1, according to an embodiment described herein.
Figure 5:
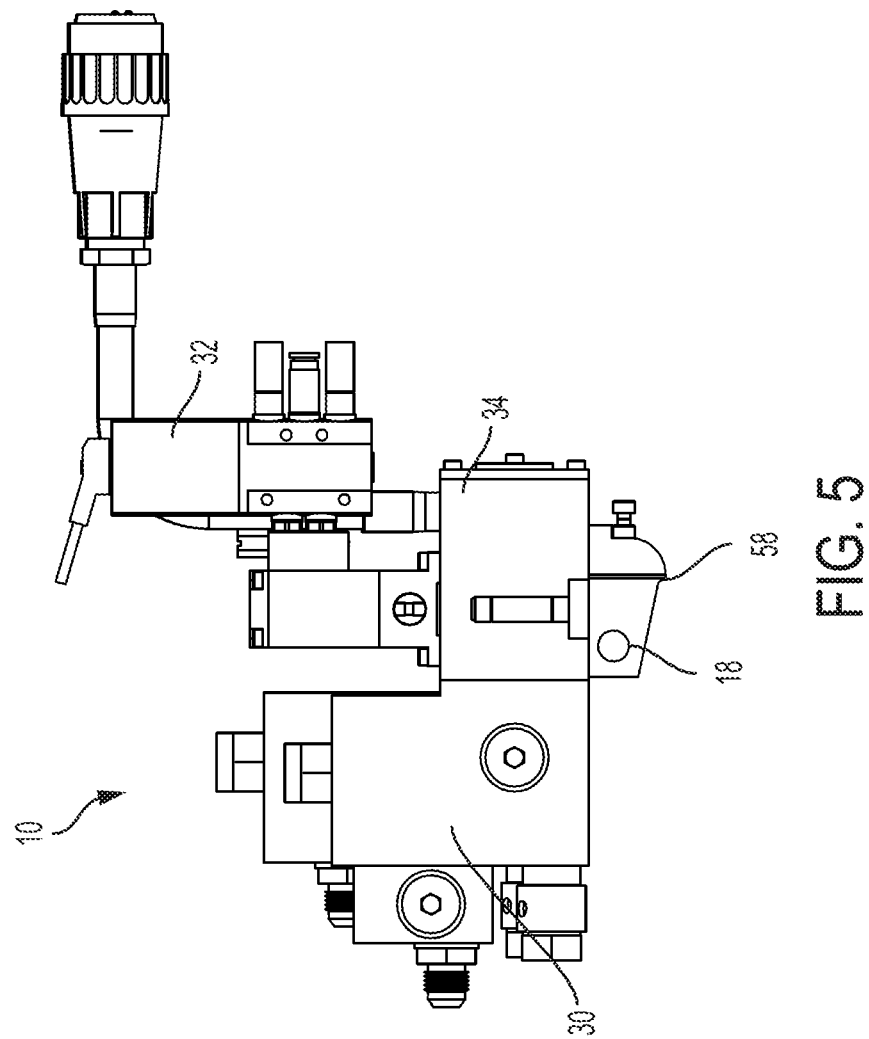
FIG. 5 is a left side view of the applicator of FIG. 1, according to an embodiment described herein.
Figure 6:
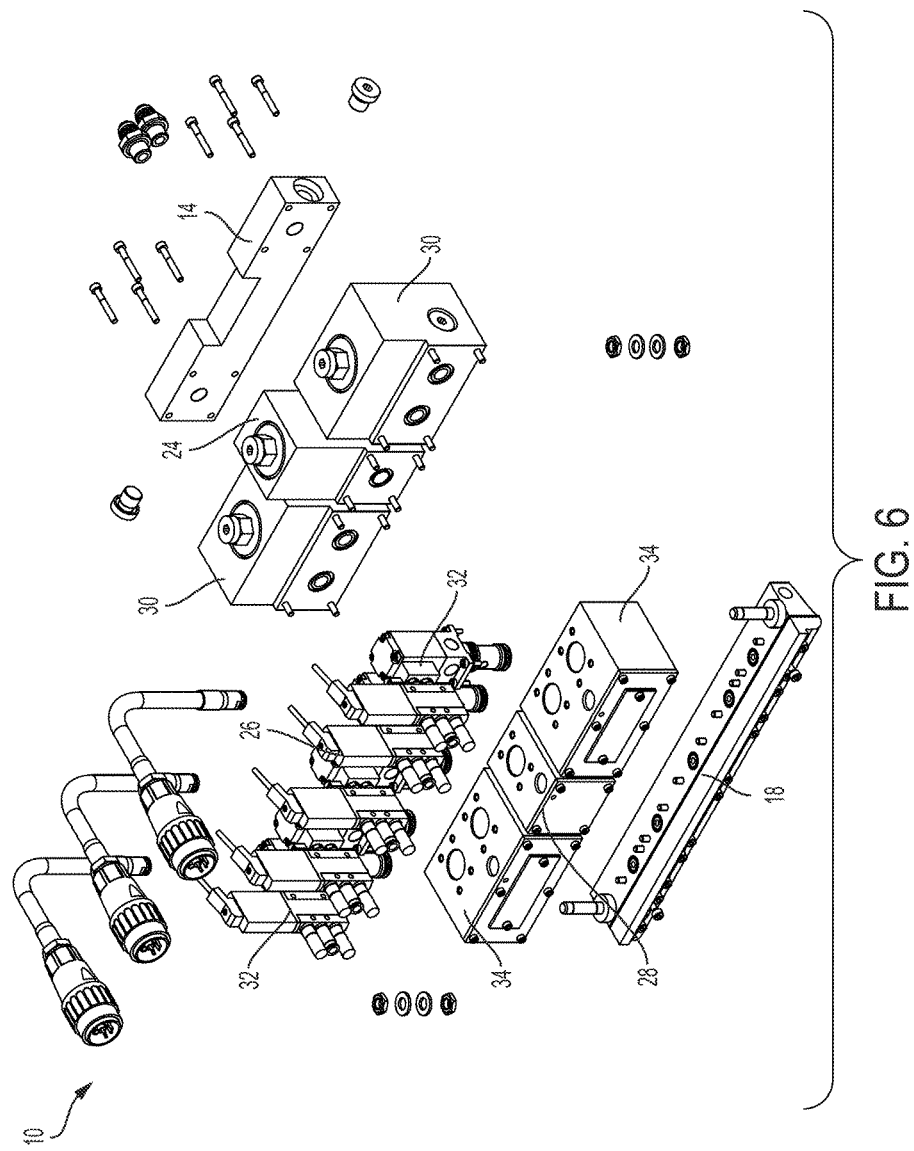
FIG. 6 is an exploded view of the applicator of FIG. 1, according to an embodiment described herein.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIGS. 1-6 show different views of an applicator 10 according to an embodiment described herein. Referring to FIGS. 1-6, the applicator 10 generally includes a central module 12, a tee block 14, one or more outer modules 16 and a slot die assembly 18. A first feed 20 may be connected to the central module 12 to deliver a first material M1 (see FIGS. 22 and 26, for example) to the central module 12 and a second feed 22 may be connected to the tee block 14 to deliver a second material M2 (see FIGS. 22 and 26, for example) to the tee block 14.

The central module 12 is configured to receive the first material M1 via the first feed 20. In one embodiment, the central module 12 may include a first filter block 24, a first valve assembly 26 and a first valve manifold 28 (may also be referred to as a "first service block"). The central module 12 may be formed having a larger surface area than conventional modules or filter blocks so that excess heat may be radiated away. The first valve manifold 28 may have a separate, discrete first heat control point and is in contact with the slot die assembly 18 over a limited contact area, to reduce heat transfer between the slot die assembly 18 and the central module 12. The first heat control point may include a first heating element 46 (see FIG. 14) to control a temperature of the first material M1. In one embodiment, the first material M1 may be a relatively low temperature material, for example, a material that degrades at temperatures above 110 C. The first valve assembly 26 may be solenoid-actuated.

The tee block 14 is configured to receive the second material M2 via the second feed 22. In one embodiment, the tee block 14 may be generally centrally located on the applicator 10, and is fluidically connected to the outer modules 16. In one embodiment, the tee block 14 may be configured to equally split the second material M2 flow to the outer modules 16 by having equal chambers and flow resistance for each outer module 16. In one embodiment, the second material M2 may be a relatively high temperature material having desired flow properties at a temperature of about 150 C.

In one embodiment, the one or more outer modules 16 include a pair of outer modules 16. Each outer module 16 may include a second filter block 30, a second valve assembly 32 and a second valve manifold 34 (may also be referred to as a "second service block"). The second material M2 may pass through a respective second filter block 30 and then to a corresponding second valve manifold 34. Each second valve manifold 34 includes a separate second heat control point. The second heat control point may include a second heating element 50 (see FIG. 17) to control a temperature of the second material. The second valve manifold 34 contacts the slot die assembly 18 over a contact area greater than the contact area between the first valve manifold 28 and the slot die assembly 18. For example, in one embodiment, the collective contact area between the second valve manifolds 34 and the slot die assembly 18 may be approximately four to eight times greater than the contact area between the first valve manifold 28 and the slot die assembly 18. The second valve assembly 32 may be solenoid-actuated.

In one embodiment, the applicator 10 includes two outer modules 16 positioned on opposite sides of the central module 12. Further, the outer modules 16 may be spaced from the central module 12 so that there is an air gap between each outer module 16 and the central module 12 to reduce heat transfer between the modules 12, 16. That is, the air gap may insulate adjacent modules 12, 16 from one another.

Figure 8:
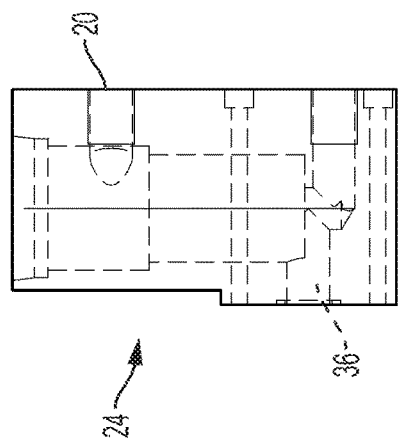
FIG. 8 is a side view of the first filter block of FIG. 7 including hidden lines.
Figure 9:
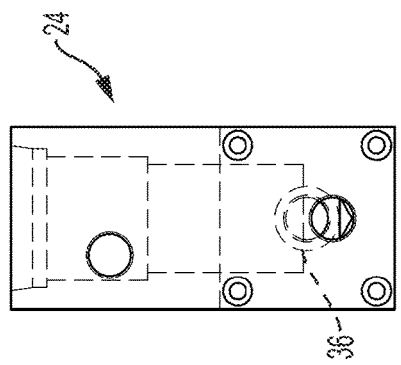
FIG. 9 is a rear view of the first filter block of FIG. 7 including hidden lines.
Figure 7:
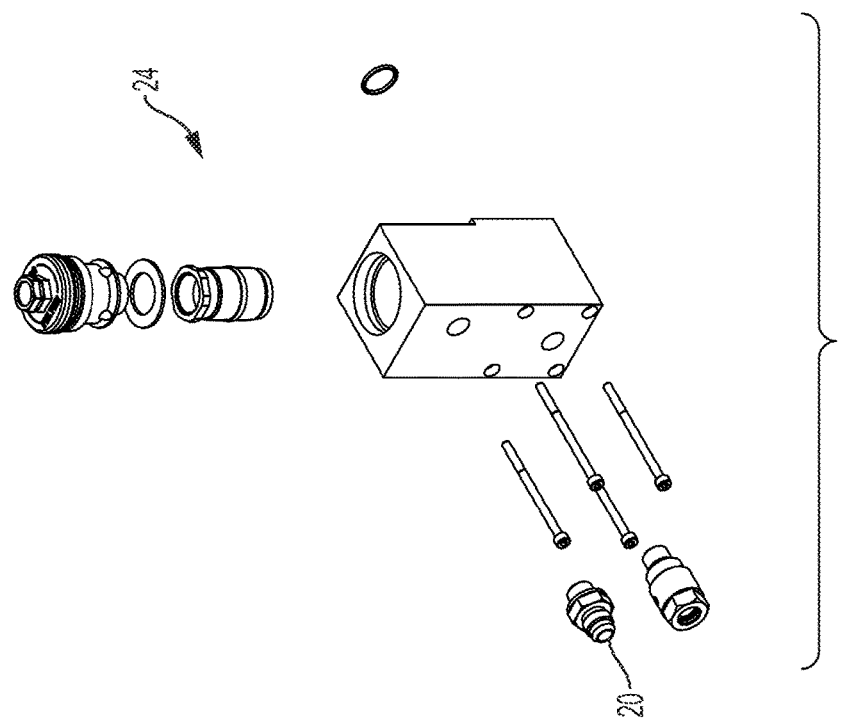
FIG. 7 is an exploded view of a first filter block according to an embodiment described herein.

FIGS. 7-9 show an exploded view, a side view and a rear view, respectively, of the first filter block 24 according to an embodiment described herein. Referring to FIGS. 7-9, the first filter block 24 is configured to receive the first material M1 through the first feed 20. The first material M1 may be discharged from a first filter outlet 36 to the first valve manifold 28.

FIG. 10 is an exploded view of the second filter block 20 according to an embodiment described herein. FIGS. 11-13 show a side view with hidden lines, a front view with hidden lines, and a perspective view of a front side of the second filter block 30. Referring to FIGS. 10-13, the second filter block 30 includes a second filter inlet 38 configured to receive the second material from the tee block 14. The second filter block 30 also includes one or more second filter outlets 40 configured to discharge the second material to the second valve manifold 34.

Figure 15:
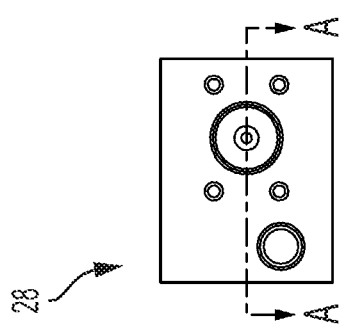
FIG. 15 is a top view of the first service block of FIG. 14.
Figure 16:
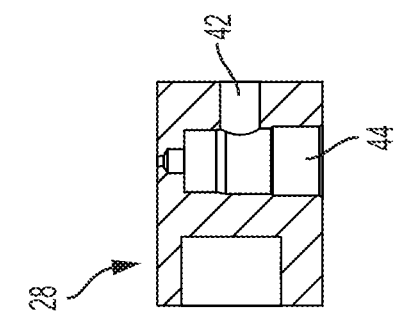
FIG. 16 is a cross-sectional view of the first service block taken at A-A in FIG. 15.
Figure 14:
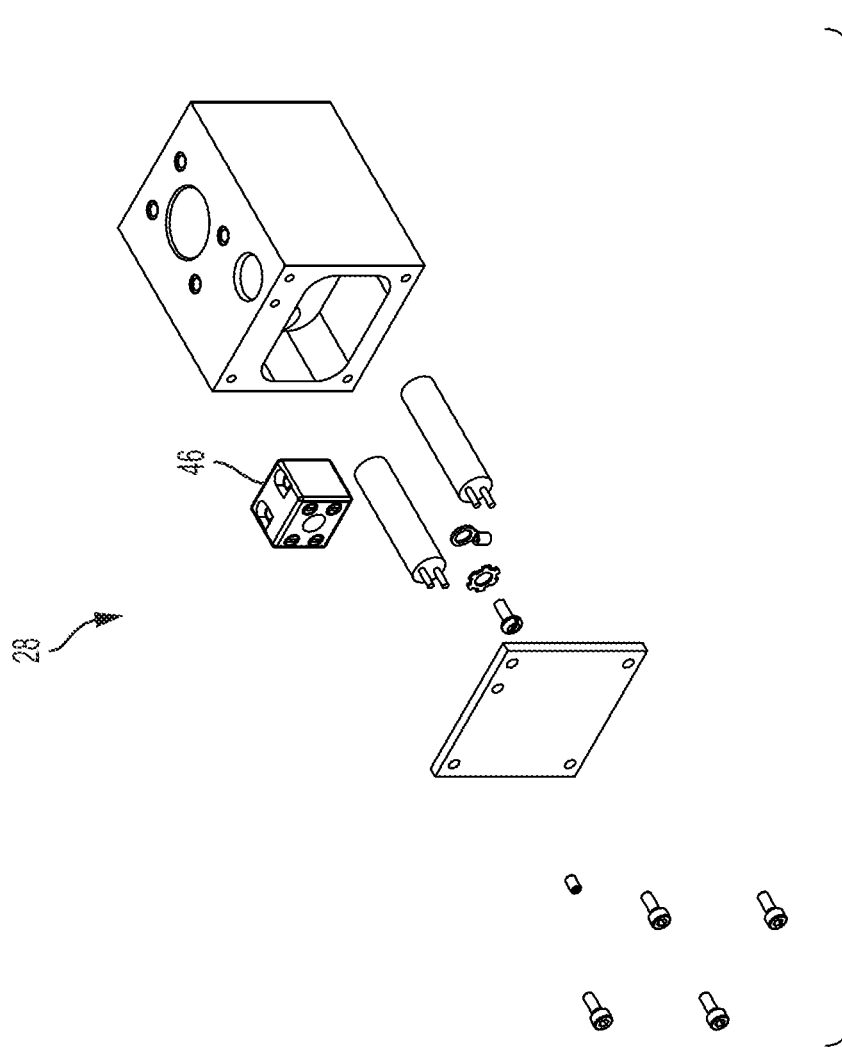
FIG. 14 is an exploded view of a first service block according to an embodiment described herein.

FIGS. 14-16 show an exploded view, a top view and a cross-sectional view of the first service block 28, according to an embodiment described herein. Referring to FIGS. 14-16, the first service block 28 includes a first service block inlet 42 configured to receive the first material M1 from the first filter block 24 and a first service block outlet 44 configured to discharge the first material M1 to the slot die assembly 18. A valve of the first valve assembly 26 may selectively open and close a passageway between the first service block inlet 42 and the first service block outlet 44 to control flow of the first material M1. The first heating element 46 may also be disposed in the first service block 24.

FIGS. 17-19 are exploded, top and cross-sectional views, respectively, of the second service block 34, according to an embodiment described herein. Referring to FIGS. 17-19, the second service block 34 includes a second service block inlet (not shown) formed in a rear face configured to receive the second material M2 from the second filter block 30 and a second service block outlet 48 configured to discharge the second material M2 to the slot die assembly 18. In one embodiment, the second filter block 30 includes a plurality of second service block outlets 48. Further, in one embodiment, a single second filter block inlet (not shown) may feed the second material M2 to multiple second service block outlets 48 by way of one or more internal passageways. One or more second valve assemblies 32 may selectively open and close respective internal passageways between the second service block inlet and the one or more second service block outlets 48 to control flow of the second material M2. The second heating element 50 may also be disposed in the second service block 34.

FIGS. 20 and 21 are a rear view and a bottom view, respectively, of the tee block 14, according to an embodiment described herein. Referring to FIGS. 20 and 21, the tee block 14 includes the second feed 22 to receive the second material M2. The tee block 14 further includes an internal channel 52 configured to deliver the second material M2 to tee block outlets 54. The tee block outlets 54 are fluidically connected to the second filter blocks 30 to deliver the second material M2 to the second filter blocks 30.

FIG. 22 is an exploded view of the slot die assembly according to an embodiment described herein. The slot die assembly 18 generally includes an adapter 56 having a shim package 58 and a die plate 60 secured thereto. The shims 58 are disposed between the adapter 56 and the die plate 60. The slot die assembly 18 is secured to the central 12 and outer modules 16 and fluidically connected thereto. A passive heat transfer device 62, such as an isobar, may be disposed in the slot die assembly 18, for example, in the adapter 56, to provide a generally even temperature in the slot die assembly 18 so that the second, high temperature material M2, is not affected, or affected within a suitable tolerance, by the first, low temperature material M1 in a central area of the slot die assembly 18, for example, a central area of the adapter 56. By reducing or eliminating a cooling effect of the first material M1 on the second material M2, the second material M2 may be maintained at a temperature providing desirable flow properties (e.g., viscosity), and low flow or increased viscosity of the second material M2 resulting from cooling may be substantially avoided. The passive heat transfer device 62 may be made of a thermally conductive metal or other material different from the material from which the adapter 56 is made. Preferably, the passive heat transfer device 62 has a higher thermal conductivity than the adapter 62. In addition, the passive heat transfer device 62 may transfer heat from higher temperature regions of the slot die assembly 18 toward lateral outer ends of the slot die assembly, which may otherwise be subjected heat loss at a higher rate than laterally internal portions of the slot die assembly 18. Accordingly, a temperature at lateral outer ends of the slot die assembly 18 may be maintained in a desirable range.

The second material M2 flows from the adapter 56 through the shim package 58 and is distributed in fluid channels (indicated with a double arrow and reference number 64) in the die plate 60 across a portion of a width of the slot die assembly 18. Subsequently, the second material M2 may be discharged through a second slot 66 in one of the shim plates 34. In one embodiment, the second slot 66 has a width so that the second material may be equally presented to cover an entire width of a desired application pattern. In one embodiment, a desired application pattern may have a width of, for example, 200 mm. However, the present disclosure is not limited to such a configuration. For example, the second slot 66 may include one or more fingers 172 (see FIG. 23) so as to form multiple second slots to provide a different application pattern or be formed of a different width. That is, the second slot 66 may be configured during manufacture to correspond to a desired application pattern.

The first, low temperature, material M1 may be distributed in the channels in the slot die assembly 18, for example, in the adapter 56 and the shim plates 58. In one embodiment, the first material M1 is distributed at a position corresponding substantially to a center of the desired application pattern and is discharged from a first slot 68 formed in a shim plate of the shim package 58. For example, the first slot 68 may be formed as multiple first slots to provide a different application pattern or be formed with a different width. That is, the first slot 68 may be configured during manufacture to correspond to a desired application pattern. In one embodiment, a width of the first material M1 does not exceed approximately 25% of the width of the second material M2 applied to the substrate. Moreover, it is understood that the slot die assembly 18 may be configured so that the first material is applied at a position offset from a center of the application pattern. The first slot 68 may be separated from the second slot 66 by a blank shim plate 70.

FIGS. 23-25 show different views of a slot die assembly 118 according to another embodiment described herein. The slot die assembly 118 may include features similar to those in the slot die assembly 18 described in the embodiments above. Accordingly, description of features similar or identical to those in the embodiments above may be omitted. Further, similar or identical features below may be referred to with the same terminology and or reference numbers used in the embodiments above.

Referring to FIGS. 23-25, and in particular to FIGS. 23 and 25, shim plates of a shim package 158 of the slot die assembly 118 may be formed similarly to the shim plates of the shim package 58 of the slot die assembly 18. However, in the embodiment shown in FIGS. 23-25, the shim plates of the shim package 158 may have a one or more cutout sections 170. In one embodiment, the cutout sections 170 may be formed at a discharge side (shown as a lower end in FIGS. 23-25) along a portion of the width of the shim plates 158. Accordingly, the shim plates 158 may vary in the height direction 'H' along the width direction 'W'.

In addition, an adapter 156 of the slot die assembly 118 may also include one or more cutout sections 174. In one embodiment, the cutout sections 174 are formed at the discharge side of the slot die assembly 118 (shown as a lower end in FIGS. 23-25). Accordingly, a dimension of the adapter 156 in the height direction 'H' may vary along the width direction 'W' of the adapter 156. In the embodiment shown in FIGS. 23-25, the cutout areas 170, 174 may provide adequate clearance for substrates having different heights being moved past the slot die assembly 118.

Further, in the embodiment of FIGS. 23-25, the slot die assembly 118 may include a recess 176. In one embodiment, the first valve manifold or service block 28 may be positioned over the recess 176 such that only edge regions of the service block 28 are in contact with the slot die assembly 118 at a surface of the slot die assembly 118 adjacent to the recess 176. Accordingly, a contact area between the first service block 28 and the slot die assembly 118 may be further reduced, and heat transfer between the first service block 28 and the slot die assembly 118 may also be reduced. That is, in such an embodiment, further separation of the different temperatures zones associated with the lower temperature central module 12 and the higher temperature outer modules 16 may be provided by reducing heat transfer to the slot die assembly 18. The recess 176 may be formed on one or more of the adapter 156, shim package 158 and die plate 160. Alternatively, the recess 176 may be formed in a surface of the first service block adjacent to the slot die assembly 118.

In some embodiments, different temperature profiles may be desired. For example, it may be desirable to limit heat transfer from the second service blocks 34 to the slot die assembly 118. In such an embodiment, additional recesses (not shown) may optionally be provided in the slot die assembly 118 at an area where the second service blocks 34 are mounted, so as to provide a gap between a portion of the second service blocks 34 and the slot die assembly 118. Accordingly, heat transfer between the second service blocks 34 and the slot die assembly 118 may be further limited by reducing a contact area between the second service blocks and the slot die assembly. Alternatively, the additional recesses may be formed in a surface of the second service blocks 34 adjacent to the slot die assembly 18.

Conversely, in some embodiments, it may be desirable to further promote heat transfer between one or more of the service blocks 28, 34 and the slot die assembly 118. In such an embodiment, the recess 176, or additional recesses (not shown) may be sized so that the first and/or second service blocks 28, 34 may be seated in the recess. This configuration increases an area of surface contact, and thus, promotes additional heat transfer. Thus, in the embodiment shown in FIGS. 23-25, heat transfer between the service blocks 28, 34 and the slot die assembly 118 may be further controlled by controlling a surface contact area between the service blocks 28, 34 and the slot die assembly as described above.

FIG. 26 is a transparent rear view of the slot die assembly 118 of FIGS. 23-25. As shown in FIG. 26, internal fluid channels 164 may distribute the second material M2 in a width direction 'W' of the slot die assembly 118. In the embodiments above, the first and second materials M1, M2 may be deposited onto a substrate in a desired application pattern P, such as that shown in FIG. 26. However, it is understood that the pattern P shown in FIG. 26 is only one example of a desired pattern, and other patterns P are envisioned and may be formed for example, by controlling flow of the first and second materials M1, M2 in the applicator 10, and/or forming first and second slots 66, 68 to have different sizes and positions in the shim package 58, 158.

In the applicator 10 described in the embodiments above, the first material M1 is kept separate from the second material M2 in the applicator 10 and only sees, or is in close relation with the second material M2 while passing though the extrusion die. Due to the short exposure time, heat transfer between the first material M1 and the second material M2 is limited, such that the first material M1 is substantially not heated by the second material M2 and the second material M2 is not cooled by the first material M1. Accordingly, degradation of the first material M1 from undesired heating and low flow of the second material M2 from undesired cooling by reduced or eliminated.

Within the slot die assembly 18 the first and second materials M1, M2 are maintained separate from each other by a blank shim 70 in the shim package 58, 158. The shim package 58, 158 allows different materials to flow onto the substrate at virtually the same application point, separated only by about 0.020 inches (i.e., a thickness of the blank shim 70). Accordingly, due to this small distance, precise start and cutoff of the first and second materials M1, M2 may be realized in an application pattern P. Further, a closeness of a knife edge may allow for crisp definition of a trailing edge of both materials. Different materials and altered patterns from those described in the embodiments above may be achieved by varying extrusion distance to provide a desired multi-pattern cutoff.

In the embodiments above, the first and second materials M1, M2 may be applied simultaneously to the substrate by a single applicator in a single pass, while maintaining the different materials at different desired temperatures. The first and second materials M1, M2 may be received and discharged from the applicator as fluids. The first material M1 may be embedded in the second material M2 upon application to the substrate. The first and second materials M1, M2 may be used, for example, to bond an outer poly layer to an absorbent layer of article, such a disposable hygiene product. By applying the first and second materials simultaneously, with the contact type slot die assembly described herein, a faster process speed may be realized than with non-contact type applicators. In addition, accumulation airborne filaments, which may cause line stoppages, may be avoided.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. An applicator for applying two materials onto a substrate comprising:
    a central module configured to receive a first material;
    a tee block configured to receive a second material;
    a pair of outer modules disposed on opposite sides of and spaced from the central module to thermally insulate the central module from the outer modules, each outer module fluidically connected to and configured to receive the second material from the tee block; and
    a slot die assembly mounted to and disposed in fluid communication with the central module and the pair of outer modules and configured to receive the first and second materials from the central and outer modules, respectively, the slot die assembly configured to discharge the first material over a first width and the second material over a second width greater than the first width,
    wherein the central module includes a first valve assembly and a first valve manifold and each outer module includes a second valve assembly and a second valve manifold.

2. The applicator of claim 1, wherein the central module includes a first heating element to control a temperature of the first material.

3. The applicator of claim 1, wherein the central module further includes a first filter block.

4. The applicator of claim 1, wherein each outer module of the pair of outer modules includes a second heating element to control a temperature of the second material.

5. The applicator of claim 1, wherein each outer module of the pair of outer modules includes a second filter block.

6. The applicator of claim 1, wherein the slot die assembly is configured to discharge the second material over an entire width of a desired application pattern.

7. The applicator of claim 6, wherein the slot die assembly is configured to discharge the first material over a portion of the width of the desired application pattern.

8. The applicator of claim 1, wherein the slot die assembly includes a first slot for discharging the first material and a second slot for discharging the second material, wherein the first slot and second slot are spaced from one another.

9. The applicator of claim 8, wherein the slot die assembly discharges the first and second materials simultaneously from the first slot and the second slot, respectively.

10. The applicator of claim 1, wherein the first heating element is configured to control a first temperature of the first material and the second heating element is configured to control a second temperature of the second material, wherein the second temperature is different from the first temperature.

11. The applicator of claim 1, wherein the tee block is mounted to the outer modules.

12. The applicator of claim 1, wherein the tee block includes a second feed configured to receive the second material and an internal channel in fluid communication with the second feed to receive the second material and deliver the second material to each of the outer modules.

13. The applicator of claim 1, wherein the tee block extends externally across the central module to each of the outer modules.

14. An applicator for applying two materials onto a substrate comprising:

a central module comprising a first feed configured to receive a first material, a first valve assembly and a first valve manifold;

a pair of outer modules disposed on opposite sides of and spaced from the central module forming an air gap between each outer module and the central module to thermally insulate the central module from the outer modules, each outer module comprising, a second valve assembly, a second valve manifold and an inlet to configured receive a second material; and a slot die assembly fluidically connected directly to the central module and the pair of outer modules and configured to receive the first and second materials from the central and outer modules, respectively, the slot die assembly configured to discharge the first material from a first slot and the second material from a second slot.

15. The applicator of claim 14, wherein the central module further comprises a first filter block and the first feed is on the first filter block.

16. The applicator of claim 14, wherein each outer module further comprises a second filter block, and each inlet is formed on a respective second filter block.

* * * * *